United States Patent [19]

Kelley

[11] 3,834,601

[45] Sept. 10, 1974

[54] TAPE RECORDING SYSTEM

[75] Inventor: Jerry O. Kelley, Grass Valley, Calif.

[73] Assignee: Arvin Industries, Inc., Columbus, Ind.

[22] Filed: July 11, 1972

[21] Appl. No.: 270,586

[52] U.S. Cl. .................................... 226/191
[51] Int. Cl. .................................... B65h 17/20
[58] Field of Search ........................ 226/190, 191

[56] References Cited

UNITED STATES PATENTS

| | | | |
|---|---|---|---|
| 2,292,851 | 8/1942 | Tykal | 226/191 |
| 3,547,372 | 12/1970 | Barnett | 226/190 X |

*Primary Examiner*—M. Henson Wood, Jr.
*Assistant Examiner*—Gene A. Church
*Attorney, Agent, or Firm*—Biebel, French & Bugg

[57] ABSTRACT

A tape recording system has a capstan with a thin low friction metallic ring forming a tape engaging surface. A compressible ring is mounted behind the metallic ring. The entire capstan penetrates into the cassette to engage the tape, and the surface of the capstan metallic ring is bounded by flanges to guide and hold the tape onto the ring. The tape take-up within the cassette presses the outermost layer of tape against the tape engaging surface of the metal ring, forming a friction drive for the take-up. A link system interconnects the supply and the take-up to maintain the outermost layer of the supply a slight distance from the capstan when the take-up is against the capstan. When the take-up is withdrawn from the capstan, the tape slips on the low friction surface of the capstan, thus avoiding pile-up and breakage of the tape. A center point and socket system supports the capstan for accurate, low friction rotation about its axis.

13 Claims, 6 Drawing Figures

PATENTED SEP 10 1974 3,834,601

TAPE RECORDING SYSTEM

BACKGROUND OF THE INVENTION

This invention relates to tape handling or transport systems, and more particularly to capstan type transport systems for magnetic tape recording and playback. Capstan drives are recognized as preferred drives for tape recording where uniform tape velocity is essential. Various forms of capstan drives are known, examples of which include U.S. Pat. No. 3,489,369, assigned to the assignee of the present invention, U.S. Pat. Nos. 2,733,069; 3,482,800, 3,520,495, and 3,575,361.

One form of drive system employs small metallic capstans driven from a constant speed device such as a synchronous motor. The capstan cooperates with a resilient pinch roller to hold the tape against the capstan surface, and the tape generally contacts the capstan surface over a relatively minor portion of the total thereof. The capstan is located downstream of the tape transducer, so that the tape drive will tend to draw the tape past the transducer at a relatively constant velocity. In general, these small metal capstans are constructed in the form of simple metal cylinders, without flanges.

In systems where relatively high tape velocities are encountered, the prior art has sometimes resorted to guiding the tape over a substantially larger capstan, perhaps 2 to 3 inches in diameter. The benefits of this type of system include more precise tape guidance and more precise velocity control. That is, by using the larger size of capstan and by maintaining the tape in contact with a major portion of the capstan surface, usually 50 percent or more, the tape may be maintained in contact with the capstan itself as it is carried past the transducer. In general, these systems use a resilient surface, such as a rubber tire, to promote friction between the capstan surface and the tape.

Such a system may also use the capstan to provide drive for the take-up roll. However, it is then necessary to have a pressured contact at the nip between the outer layer of the take-up roll and the capstan surface. This tends to change the capstan contour at the nip, introducing velocity errors. It may also stretch and/or cup the tape by causing its edges to bend away from the plane of the tape. Further, if the take-up accidentally moves away from the capstan in such an arrangement, the tape will continue to move at the capstan speed since the tape is wrapped about a large part of the relatively high friction capstan surface. At the same time, however, the take-up generally slows somewhat, resulting in tangle or breaking of the tape as the capstan then causes the tape to overrun the take-up.

There are other disadvantages to resilient capstan surfaces. In general they are more difficult to maintain concentric, and they are noticeably more dimensionally unstable if exposed to changing temperatures. Also, temporary deformation often sets in when the capstan is left in stationary contact for any time with a satellite. All of these factors tend to induce out-of-round conditions which in turn result in velocity errors that are exhibited as unwanted variations or "flutter" in the signal output. On the other hand, it is desirable to have some resiliency in the region where the transducer head contacts the tape, since this minimizes mechanical problems, compensates for changes due to wear, and provides for interchangeability of parts which may not be precisely identical.

Non-resilient capstan surfaces, on the other hand, can present additional problems, particularly where mylar based recording tapes are used. Such tapes are notoriously incompressible, and minor irregularities in the tape pack therefore produce bumps at the tape pack surface, resulting in a pack that is not perfectly round. Seemingly trivial irregularities, such as the beginning of the tape at the center of the pack, a tape splice, and so on, can cause high impact forces when the incompressible tape pack is rotated at high speed against a solid capstan. The result is a non-uniform tape velocity.

In tape handling systems where the capstan provides the drive for the take-up roll, it has also been recognized that it is desirable to maintain the supply roll adjacent, but disposed a slight distance away from, the capstan. U.S. Pat. No. 3,489,369 discloses a device for accomplishing this purpose, but a less costly, less complicated and equally reliable positioning control would also be desirable.

Similarly, where the capstan must provide the drive for the take-up roll, very much greater forces appear on the capstan supports than when the take-up roll is separately driven. As a result, these supports, and especially the pivot portions thereof, are subject to heavy loads which limit the ability of the capstan to provide long, distortion free service.

SUMMARY OF THE INVENTION

In accordance with this invention, a cassette tape recording system provides for low friction tape handling in which a relatively large diameter capstan carries the tape past the transducer. The capstan and transducer are mounted on the tape deck and penetrate into the cassette to engage the tape.

The capstan is constructed of a suitable material, preferably a lightweight metal which reduces inertia and thus promotes quick turn around in a reversible tape transport. The capstan includes a central core, a shaft on which the capstan is rotated, a resilient intermediate ring, and a thin outer metallic ring which surrounds the intermediate ring. The outer capstan ring forms a relatively low friction tape engaging surface, and may also include flanges which define the boundaries of the surface.

Although the transducer is normally stationary, it may be moved to follow different longitudinal tracks on the tape, and is positioned approximately midway between the point where the tape engages the capstan and the point where the tape leaves the capstan toward the take-up.

The take-up is formed as layers of tape on a hub which can move toward and away from the capstan on a pivoted arm. The hub is pressed toward the capstan to create a pressure point between the outer layer of tape on the take-up and the tape engaging surface on the capstan. The pressure at this nip causes the capstan to provide a friction drive for the take-up. However, if the take-up should bounce or accidentally be withdrawn from the capstan, the relatively low friction of the metal capstan surface will permit it to slip relative to the tape. In such a circumstance the tape then assumes the velocity of the take-up, which is frequently decelerating under such conditions, while the capstan continues at its normal speed. Pile-up or tangling of the tape, caused by prior art high friction capstans, is thus avoided.

The thin outer metallic ring on the capstan allows the capstan to be machined very precisely and to retain its shape independently of changes in environmental conditions, such as temperature. Similarly, the metallic surface is much more resistant to wear than the resilient surfaces commonly employed in tape handling systems which drive the take-up roll with the capstan.

At the same time, the resilient intermediate ring immediately beneath the thin outer metallic ring cooperates with the latter to allow the incompressible metallic ring to flex and yield slightly, as when irregularities on the tape pack are encountered. As a result, the benefits of a low friction metallic capstan having a uniform and consistently true surface are combined with the advantages of a capstan which "forgives" irregularities when encountered.

An arm link system interconnects two arms pivotally supporting the tape hubs and automatically positions the arms relative to each other. Each arm is provided with a link pivotal connection disposed a short distance from the axis about which the arm swings, and the link is connected to the arms through these pivots. The link thus interconnects the two arms and programs their relative positions at all times. The link itself is a turnbuckle which is threadably engaged on screws attached to the link pivots. The turnbuckle allows the link length to be adjusted very precisely.

Since the arms rotate about separate axes, and since the link is pivotally connected to each arm at distances removed from these axes, the link, link pivots, arm axes, arms, and the line connecting the arm axes, combine essentially to form a four-sided polygon. The polygon is selected such that the movement it imparts to the two arms compensates for the well known non-uniform variation of take-up and supply diameters as the tape is moved therebetween. As a result, the outermost layer of tape on the supply roll is always maintained adjacent to but slightly removed from the capstan itself. This positioning of the supply and take-up results automatically when the take-up is urged against the capstan, and is automatically maintained thereafter.

The shaft of the capstan itself is supported at both ends by supports which define the axis of rotation of the shaft. The lower end of the shaft is provided with a pointed pivot which is received into a complementary socket support. The upper support is a point pivot similar to that on the lower capstan shaft end. A socket is formed in the upper end of the capstan shaft itself to accept the upper support pivot point. The center point and socket system thus provides the sole rotational support for the capstan, supporting it for very low friction rotation about its axis.

The capstan shaft is formed of material which is harder than that of the supports, so that the system may very easily be adjusted to compensate for wear and tear. The supports need only be sharpened, reshaped, and/or replaced when the wear is excessive. Minor amounts of wear may easily be accommodated by adjusting the clearances among the three elements of the center point and socket system. As a result, the capstan is able to provide long and distortion free service notwithstanding the heavy loads to which it is subjected in driving the take-up roll.

The tape cassette is held in position on the tape deck by cassette locator tabs. In order to facilitate insertion and removal of the cassette on the deck, the transducer head is retractable. After the cassette is inserted, the head rises from the deck into the cassette and then moves toward the capstan to interface with the tape. To remove the cassette, the transducer head first moves away from the capstan and then retracts beneath the tape deck. The capstan rotates on a shaft which is mounted in a fixed position on the tape deck. The tape then engages the capstan when the cassette is slid onto the deck and the capstan penetrates into the cassette.

It is therefore an object of this invention to provide a tape recording system in which the capstan drives the take-up; in which the tape is free from pile-up and breakage during failures of contact between the capstan and the take-up; in which the capstan has a low-friction tape engaging surface to allow slippage of the tape thereover when the capstan is not in contact with the take-up; in which the low-friction tape engaging surface of the capstan is itself incompressible but is flexibly mounted on a compressible ring to forgive irregularities in the take-up rolling thereagainst; in which the capstan is machineable to very precise dimensions and will retain those dimensions; in which the capstan is mounted in an uncomplicated, durable, point and socket pivot connection allowing for easy adjustment and compensation for wear; in which an uncomplicated, programmed arm interlock system maintains the outermost layers of tape on the supply and take-up a certain distance from each other; in which the outermost layer of the supply is maintained by the arm interlock system at a certain finite distance from the capstan when the take-up is held thereagainst; in which the capstan penetrates into a tape cassette to interface with and drive the tape; and to accomplish the foregoing in an uncomplicated, durable, highly reliable and precise configuration, readily suited to the most demanding tape recording environments.

Other objects and advantages of the invention will be apparent from the following description, the accompanying drawings and the appended claims.

DESCRIPTION OF THE PREFERRED EMBODIMENT

Figure 1:
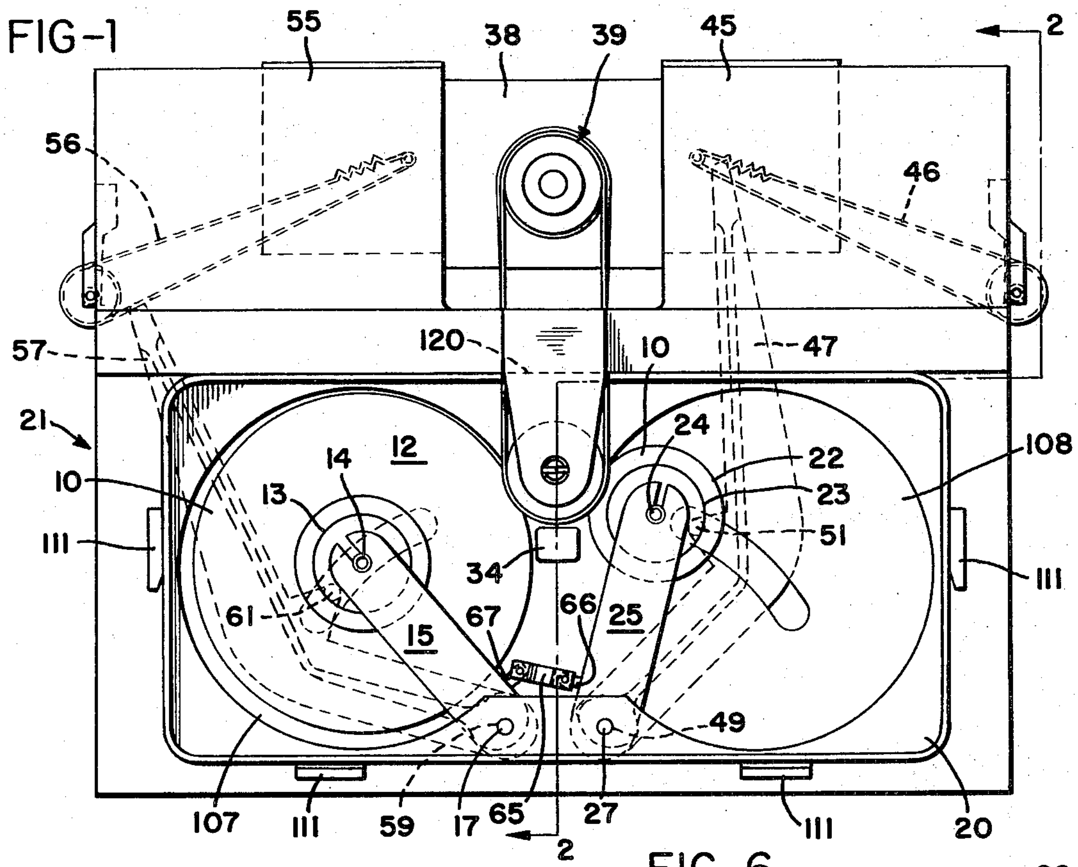
FIG. 1 is a top view of a tape recording system according to this invention.

Referring to the drawings, and more particularly to FIG. 1, there is disclosed a preferred embodiment of this invention in which the tape 10, for example a magnetic recording tape, is shown coming from a supply roll 12 which is formed as layers of tape wound on a rotatable hub 13 supported on an axle 14. Axle 14 is in turn carried on a supporting arm 15 that is pivotally mounted at 17 to a removable cassette 20 mounted on the tape deck 21. The tape 10 passes from the supply roll to a similar take-up roll 22 where it is supported and wound on a rotatable hub 23 having an axle 24 mounted on a supporting arm 25. Arm 25 is pivotally mounted to the cassette 20 through the pivot hinge or pin 27. In a reversible deck, hubs 13 and 23 may each serve as either supply or take-up hubs accordingly.

Suitable one-way acting brakes (not shown) may be provided for axles 14 and 24 to provide limited resistance to unwinding of the tape from each associated hub, and to maintain tape tension, for example, during power failures. When the hub is rotated in the opposite or tape winding direction the brake has no effect.

The tape is passed around a rotatable circular driving member, such as capstan 30, which is mounted on a rotatable capstan drive shaft 33. The capstan carries the tape across a magnetic transducer head 34 which is mounted to interface with the tape at one side of the capstan. Transducer head 34 carries an erase transducer 35*a*, a record/playback transducer 35*b*, and an erase transducer 35*c*, to enable the tape to be handled in either direction.

Although the transducers are normally stationary when the cassette is on the tape deck, they may be moved by a mechanism (not shown) such as is disclosed in U.S. Pat. No. 3,604,847, issued Sept. 14, 1971 and assigned to the assignee of the present invention, to follow different longitudinal tracks on the tape. The transducers are positioned approximately midway between the point where the tape engages the capstan and the point where the tape leaves the capstan toward the take-up.

Since it is desirable for a number of reasons to have some resiliency in the region where the head carrying the transducers contacts the tape, a stationary tape guide 36 immediately in front of the capstan and facing the transducer guides a short span of tape 10 into interfacing relation with transducers 35 at a distance slightly removed from capstan 30.

Capstan 30 itself is driven through shaft 33 by a synchronous motor 38, similarly as in U.S. Pat. No. 3,641,279 issued Feb. 8, 1972. A drive connection, such as the belt and pulley drive 39 shown schematically in FIG. 2, connects the motor 38 to the shaft 33. In a two-way reversible tape deck configuration such as shown, motor 38 is reversible.

In order to bring the take-up roll 22 into driving contact with capstan 30, a torque motor 45 is provided. Torque motor 45 is actuated to place a constant tension on cable 46, and swing arm 47 is attached to cable 46 to pivot about swing arm pivot 49. A finger 51 on the swing arm 47 is mounted to project against take-up arm 25 to urge it around pivot 27 toward capstan 30. Thus, when torque motor 45 is energized it will draw swing arm 47 toward the capstan, causing finger 51 to urge arm 25 toward the capstan as well. The take-up roll 22 will therefore be brought into contact with capstan 30, and the outermost layer of tape on the take-up will engage the capstan for frictional driving thereof.

Since the recording system is reversible, supply roll 12 is similarly provided with a torque motor 55, cable 56, and swing arm 57. Arm 57 pivots about pivot 59 to bring finger 61 on arm 57 against supply roll arm 15. By this means torque motor 55 may be energized to bring roll 12 into frictional driving contact with capstan 30 when the tape deck is reversed and roll 12 becomes the take-up roll.

As is more fully explained in U.S. Pat. No. 3,489,369, it is quite desirable to hold the tape departure point of supply roll 12 at a predetermined and constantly spaced relation to the capstan. A preferred configuration causes tape 10 to span a gap, for example, of about 0.01 inches from its point of departure from the supply roll to its point of initial engagement with the peripheral face of the capstan. Since the capstan is interposed substantially in between the supply 12 and take-up 22, the distances between the outermost layers of tape on both the supply and take-up hubs must be essentially constant if the 0.01 inch gap is to be maintained. A programmed interlocking means is therefore provided in this invention to interconnect both hubs to control the distances therebetween. The interlocking means generally defines a four-sided polygon which maintains the outermost layers of tape on each hub at essentially a certain predetermined distance from each other. The interlocking means also prevents the outermost layers of tape on both hubs from coming into contact simultaneously with the capstan.

The interlocking means includes a link 65 interconnected between swing arm 47 and swing arm 57. Link 65 is connected to each arm through pivots 66 and 67 respectively thereon. Pivots 66 and 67 are disposed along arms 25 and 15 at certain predetermined distances from pivots 27 and 17. The distance between hubs 23 and 13 is therefore rigidly determined and controlled by the four-sided polygon defined by link 65, arm 25 between pivot 66 and pivot 27, the tape cassette between pivot 27 and pivot 17, and arm 15 between pivot 17 and pivot 67. Thus, by the appropriate selection of these distances, the shape of the polygon is determined and the relationship between the arms fully programmed. Only one torque motor 45 or 55 is actuated at a time, bringing its respective roll 22 or 12 into contact with capstan 30. At the same time the tape hub interlocking system brings the other respective tape roll into the precisely desired configuration discussed above. Since its relation with respect to the roll being urged by the torque motor is fully programmed, it is brought directly into the desired relationship with capstan 30.

In order to provide for convenient adjustment of link 65, the link is in the form of a turnbuckle having a first threaded end 71 and a second threaded end 72. End 72 has threads reversed from those of end 71. A first turnbuckle screw 73 is threaded for engagement with link end 71, and a second turnbuckle screw 74 is reverse threaded for engagement with end 72 of turnbuckle 70. Turnbuckle screws 73 and 74 are in turn connected to pivots 66 and 67. Thus by rotating turnbuckle 70, link 65, may be either extended or retracted in length in response to the direction of rotation of the turnbuckle, to provide for adjustment of the arm link interlock. Locknut 75 allows the turnbuckle to be locked firmly in position once it is properly adjusted.

Capstan 30 is constructed of metal, such as brass or steel, and preferably of a lightweight metal such as aluminum. Lightweight materials are advantageous due to their reduced inertia which allows the tape recording system to be reversed quickly. The capstan is preferably of a single piece so as to be an integral unit which can be mounted directly on drive shaft 33. Such a construction provides for improved concentricity and in general yields a more accurate capstan configuration.

The capstan is provided with integral outwardly extending flanges to guide the tape onto the capstan. The flanges may be attached directly to the capstan core 80, such as flanges 82 in FIG. 4, or they may be attached to the peripheral surface 85 of capstan 30, such as flanges 86 in the preferred configuration of FIG. 5.

Surface 85 is a thin, incompressible, continuous, low friction tape engaging surface capable of limited flexing in a direction radially of the capstan. Surface 85 is thus preferably formed on the outside of a thin machineable metal ring 88. Ring 88, in turn, is mounted on a ring of compressible material 90 situated about the capstan core 80. Compressible ring 90 thus cooperates with ring 88 to allow the latter to yield slightly and to forgive irregularities which may be encountered in the system. At the same time, the material of ring 88 itself is incompressible. As a result, although the flexibility of ring 88 allows it to yield in cooperation with ring 90, it will strongly resist permanent deformation. Since ring 88 itself is not compressible, it also will not take a temporary "set" if left in contact for any period of time with a stationary satellite. Similarly, ring 88 allows the entire capstan to be machined and tuned as one assembly, thereby resulting in a very high precision capstan.

Figures 2, 3, 4, 5, 6:
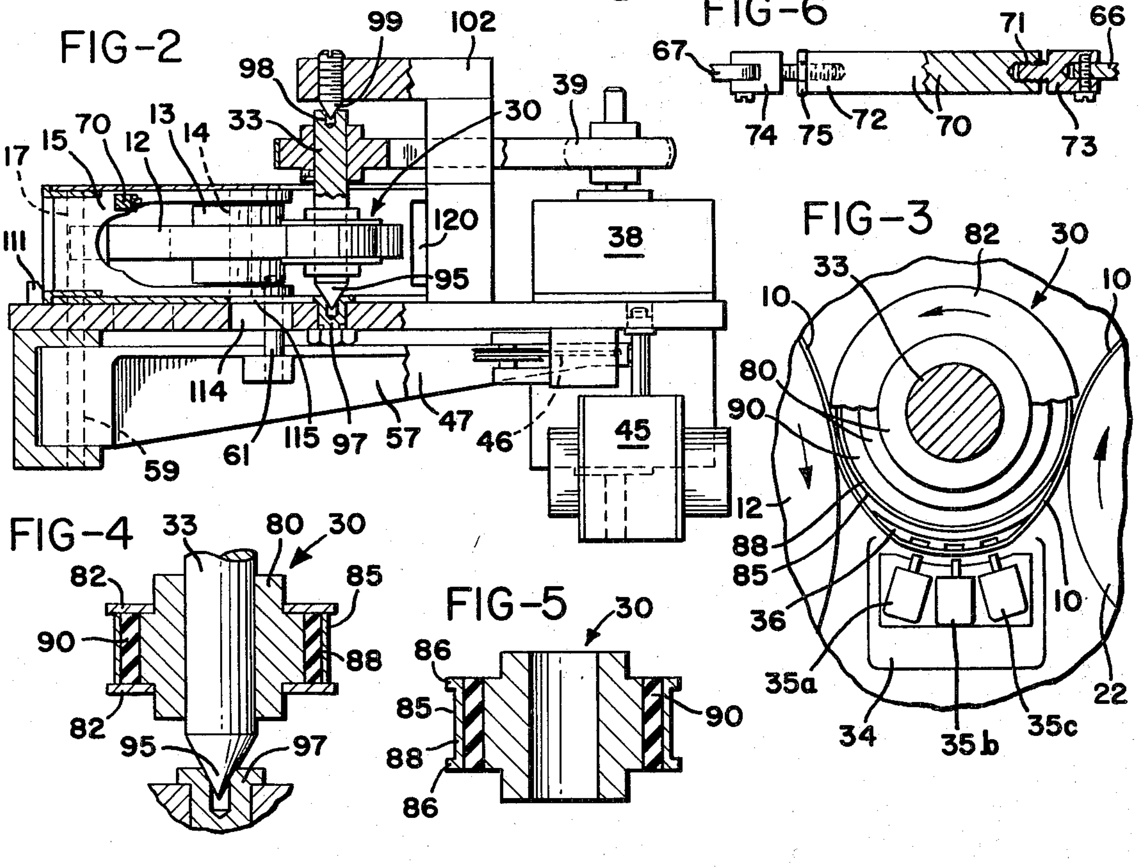
FIG. 2 is a partial cross sectional view of the FIG. 1 apparatus taken generally on line 2—2 thereof, with the tape guide and tape transducer head omitted for clarity.
FIG. 3 is an enlarged top view, partially in section, of the interface between the tape and the supply the capstan of FIG. 4, the tape guide, the transducers, and the tape-up.
FIG. 4 is a cross sectional view of one embodiment of the capstan of this invention.
FIG. 5 is a cross sectional view of another embodiment of the capstan of this invention.
FIG. 6 is an enlarged, partial sectional view of the turnbuckle configuration of the link interlock of this invention.

Referring to FIGS. 1 and 3, the force holding the take-up 22 against capstan 30 is sufficient to provide a force, at the place or nip where the tape leaves the capstan and becomes the outermost layer of take-up tape, to provide frictional driving of the take-up 22. Under normal operating conditions, the velocity of the tape equals the velocity of surface 85, and this has been achieved with a force therebetween on the order of three times less than the force required with a resilient (i.e. rubber) capstan. At the same time, the use of the metal surface capstan completely eliminates the problem of cupped tape. In fact, rolls of tape that have been cupped and damaged by being run against a rubber capstan, to the extent that they will no longer run thereon, can be straightened and used successfully with the capstan of this invention.

If for any reason the take-up 22 should bounce away from contact with the capstan, or if, due to a power supply failure, torque motor 45 or 55 should be suddenly deenergized, the tape will assume the velocity of the take-up roll since the reduction in force immediately permits the surface of the capstan to slip relative to the tape. This is in contrast to the situation with a rubber surfaced capstan, where there is substantially higher frictional contact between the tape and the capstan surface, and where under such circumstances the capstan will continue to drive the tape at a higher velocity while the take-up is decelerating. As a result, the present invention minimizes the cause of tangles, overruns and breakage which often result from accidents of this type.

Since the capstan must also drive the take-up, it is subject to considerable forces. The rotational supports for shaft 33 are therefore subject to rapid deterioration. Due to the extreme precision required in many tape recording systems, this type of wear quickly becomes unacceptable, since the bearings and supports must frequently be replaced, and since each replacement usually requires careful realignment of the capstan shaft.

In this invention, however, the problem is greatly simplified through the use of center point and socket pivots for shaft 33. Shaft 33 is formed of a hard metallic material, such as steel, and has a center point 95 on the lower end thereof. The lower support for shaft 33 is a lubricant retaining socket 97 formed of a softer metallic material such as brass.

Similarly, the upper end of shaft 33 is provided with a socket 98, to retain lubricant, and the upper shaft support is a brass center point 99 which is received in socket 98. Center point 99, in turn, is threadably received in plate 102 to provide for precise adjustment thereof by threading it inwardly or outwardly of plate 102 to bring shaft 33 into proper alignment, and to support shaft 33 rotatably on the axis defined by the supports 97 and 99. The cooperation between the center points (95 and 99) and the sockets (97 and 98) also provides for easy compensation of minor wear, since support 99 needs only to be tightened slightly to compensate therefor. Further, supports 97 and 99 may easily be replaced or re-shaped when desired. Shaft 33, on the other hand, is of a material harder than supports 97 and 99 since the latter are much more easily replaceable than the former. The lower end of shaft 33 is provided with the center point 95 to support the weight of the shaft thereon in socket 97.

This invention is illustrated in the form of a cassette tape recording system, in which cassette 20 includes wells 107 and 108 for receiving rolls 12 and 22 respectively. The cassette is supported in position on the top surface of the tape deck and is held in proper orientation thereon by side and front position locator tabs 111.

To facilitate insertion and removal of cassette 20 onto tape deck 21, the transducer head 34 is retractable. When the cassette is not on the deck or is being inserted or removed therefrom, head 34 is retracted beneath the top surface of deck 21. After the cassette is inserted, head 34 rises through an opening 114 in the top surface of the tape deck and through an opening 115 on the bottom of cassette 20. Head 34 then moves toward tape guide 36 and capstan 30 to bring transducers 35 into interfacing relationship with tape 10. When the cassette is to be removed, the motions of head 34 are reversed. Tape guide 36 and capstan 30 themselves do not retract but instead remain in position on tape deck 21, with the axis of rotation of capstan 30 extending through the top of the tape deck.

To insert cassette 20 onto tape deck 21, then, one first ascertains that head 34 is fully retracted. The cassette is then slid on to the top surface of the tape deck, and the tape guide 36 and the capstan 30 enter the cassette through an entrance opening 120 on the side of the cassette facing the capstan. Tape guide 36 and capstan 30 thus are brought into interfacing relationship with the loop of tape 10 passing from supply roll 12 past opening 120 to take-up roll 22 within the cassette. When the cassette is fully in position it is then engaged and held by locator tabs 111, following which head 34 is moved toward the capstan into its proper position with regard to the tape.

As may be seen, therefore, this invention has numerous advantages. The system is virtually free of accidental tape overruns and breakages. The capstan is a high precision capstan which retains its configuration regardless of environmental conditions, including temperature variations and periods of rest against a satellite. At the same time, the capstan is forgiving of systemic irregularities. The tape reels are interlocked to maintain the outer layers thereof in the precisely desired configuration, yet the interlock is uncomplicated and very easily programmed. The supports for the capstan shaft are self-centering and easily compensated for wear and tear.

While the forms of apparatus herein described constitute preferred embodiments of this invention, it is to be understood that the invention is not limited to these precise forms of apparatus, and that changes may be made therein without departing from the scope of the invention.

What is claimed is:

1. In a tape recording system including a tape supply, a tape take-up, a rotatable capstan, and means to guide tape along a path passing around a portion of the capstan for carrying the tape from the supply to the take-up, the improvement comprising:

a. non-compressible means defining a continuous, low-friction tape engaging surface on the periphery of the capstan, said surface being capable of limited flexing in a direction radially of the capstan, and, b. a compressible ring behind said tape engaging surface on the capstan.

2. A tape recording system as defined in claim 1 further comprising flanges defining the edges of said tape engaging surface and guiding the tape onto said surface.

3. The tape recording system of claim 2 wherein said flanges are integral parts of said tape engaging surface.

4. A tape recording system as defined in claim 1, wherein the core of the capstan is constructed as a unitary metallic member with integral outwardly extending flanges extending beyond said compressible ring and at least to said tape engaging surface, and forming the boundaries of said surface.

5. A tape recording system as defined in claim 1 wherein said means defining said tape engaging surface is a thin metal ring.

6. The tape recording system of claim 5 further comprising flanges defining the edges of said tape engaging surface and guiding the tape onto said surface.

7. The tape recording system of claim 6 wherein said flanges are integral parts of said tape engaging surface.

8. The tape recording system of claim 5 further comprising:

a. a take-up hub onto which the tape is wound, and b. means urging said take-up hub toward the capstan to promote frictional drive of the tape onto said take-up hub due to contact between said capstan tape engaging surface and the outermost layer of tape on said take-up hub.

9. A capstan for a tape recording system comprising:

a. a central core, b. a compressible ring on said central core, and c. incompressible means defining a thin, flexible, continuous, low-friction tape engaging surface on said compressible ring and forming the periphery of the capstan, for engaging and moving a tape therepast.

10. The capstan of claim 9 further comprising flanges defining the edges of said tape engaging surface for guiding tape onto said surface.

11. The capstan of claim 10 wherein said flanges are integral parts of said tape engaging surface.

12. The capstan of claim 10 wherein said flanges are attached to said capstan core.

13. The capstan of claim 9 wherein said tape engaging surface is a metallic surface.

* * * * *